United States Patent [19]
Sopcisak

[11] Patent Number: 5,772,048
[45] Date of Patent: Jun. 30, 1998

[54] QUICK-RELEASE BICYCLE STAND

[76] Inventor: Michael Ivan Sopcisak, 4549 W. 27th Ave., Denver, Colo. 80212

[21] Appl. No.: 635,662

[22] Filed: Apr. 22, 1996

[51] Int. Cl.⁶ ........................................................ A47F 5/00
[52] U.S. Cl. ............................... 211/20; 211/86; 211/196; 211/22
[58] Field of Search ................................. 211/17, 21, 22, 211/20, 18, 19, 86, 205, 196, 105.3, 105.6; 248/316.2, 316.3

[56] References Cited

U.S. PATENT DOCUMENTS

| | | | |
|---|---|---|---|
| 672,070 | 4/1901 | Smith | 211/19 |
| 706,718 | 8/1902 | Bradbury. | |
| 2,855,037 | 10/1958 | Stiffel. | |
| 2,903,227 | 9/1959 | Key. | |
| 2,941,669 | 6/1960 | Palay et al. | 211/86 X |
| 3,035,708 | 5/1962 | Freeman | 211/86 |
| 3,424,317 | 1/1969 | Singer | 211/196 X |
| 4,352,432 | 10/1982 | Smith | 211/19 |
| 4,552,270 | 11/1985 | Lentz et al. | 211/17 |
| 4,813,550 | 3/1989 | Saeks | 211/17 |
| 5,036,987 | 8/1991 | Smiedt | 211/22 |
| 5,083,729 | 1/1992 | Saeks | 211/22 |
| 5,086,930 | 2/1992 | Saeks | 211/17 |
| 5,238,125 | 8/1993 | Smith | 211/22 X |

FOREIGN PATENT DOCUMENTS

| | | | |
|---|---|---|---|
| 898870 | 7/1944 | France | 211/17 |
| 1456813 | 11/1976 | United Kingdom | 248/316.3 |

*Primary Examiner*—Robert W. Gibson, Jr.

[57] ABSTRACT

A Bicycle storage or display rack comprising:

A telescopic Main Body Member comprised of a Lower Body Member and an Upper Body Member whereby the Upper Member is slidably disposed within the Lower Member thereby allowing the Main Body to be telescopically extended or retracted. A Locking or Clamping Device is provided whereby the overall length of the Main Body can be rigidly secured at any length of extension or retraction. Resilient-Pressure End Caps, located at the opposing ends of the Main Body, allow the rigidly secured Main Body Member to be effectively compressed or wedged between two opposing mounting surfaces. Bicycle suspension means, adapted for attachment to said Main Body Member, allow effective suspension of bicycles from the Main Body Member. Said bicycle suspension means include a Perpendicular Wheel-Hook Assembly, comprised of at least two sets of Wheel Hook Apertures, wherein one set is drilled substantially perpendicular and substantially staggered relative to the other set. Said suspension means further comprising at least one Wheel Hook adapted for positioning in any of said Wheel Hook Apertures allowing suspension of one or more bicycles in a variety of configurations, including the significant storage of two bicycles in a corner. An adjustable Lower Tire Rest is also included whereby the lower wheel of a suspended bicycle is retained.

19 Claims, 5 Drawing Sheets

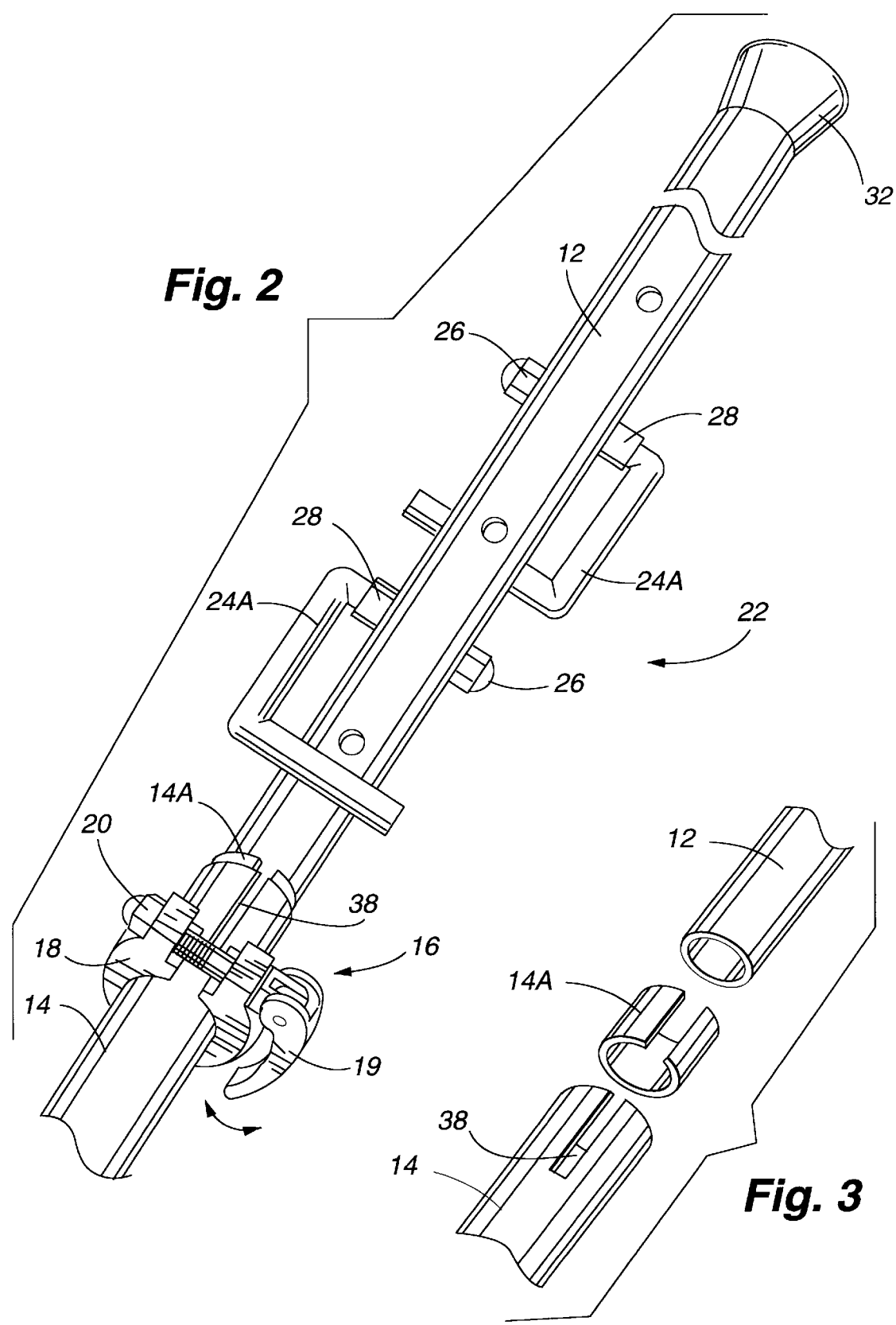

QUICK-RELEASE BICYCLE STAND

BACKGROUND

1. Field of Invention

This invention relates to article display or storage systems, specifically to an improved storage rack for bicycles.

2. Discussion of Prior Art

Conventional bicycle storage methods vary widely in design and function, but generally can be considered one of three types:

1. Bicycle racks adapted for permanent attachment to a mounting surface such as a wall or a ceiling.
2. Free-standing bicycle racks.
3. Bicycle racks adapted for vertical extension between two opposing surfaces, most commonly the floor and the ceiling.

Unfortunately, each of these approaches has inherent disadvantages.

Once mounted, wall or ceiling racks adapted for permanent attachment can be difficult to adjust or move. Repositioning such a rack, or moving it to a new room, apartment, or home requires the user to dismount and remount the rack. Not only can this be difficult and time consuming, but removal of the rack leaves undesirable holes in the former mounting surface.

Free-standing racks generally consist of means to hold a bicycle supported by a pedestal or a base member. Although portable, the use of a pedestal or a base can make the rack bulky and cumbersome. Unfortunately, the size and configuration of the base inherently limits the use of the rack to areas with adequate floor space, and can limit how and where the rack is stored when not in use.

Racks adapted for vertical extension between the floor and the ceiling overcome some of these disadvantages by providing a portable rack that eliminates the need for a base or pedestal. However, this approach has several disadvantages, which are the aim of this patent application.

Unfortunately, racks adapted for vertical extension between the floor and the ceiling can be difficult to set up. U.S. Pat. No. 4,552,270 to Lentz and Dale discloses a rack that provides a pair of overlapping body members, multiple cross-support pieces, and finely adjustable foot members. Set up of this rack requires the user to first adjust the overall length of the support members and define several overlap regions. While maintaining the alignment of the overlap regions, the user must then position at least two cross-support pieces which bind the rack at the chosen overall length. Finally, in order to secure the rack into position between the floor and the ceiling, the user must stoop down and individually adjust two separate foot members located at the bottom of the rack. All of this must be achieved while holding the rack upright. This can be both difficult and time consuming.

Similarly, U.S. Pat. No. 4,813,550 to Saeks discloses a vertically extensible rack that is difficult to set up. In his invention, Saeks provides a main body member that overlaps a bifurcated height adjustment member, and finely adjustable foot members. Operating on the same principle as Lentz and Dale, Saek's invention requires the user to adjust the overall length of the rack, align predefined adjustment regions, and position bolts or dowels to provide cross support. Again, final securement of the rack is achieved by adjusting two separate foot members while simultaneously holding the rack upright.

U.S. Pat. Nos. 5,083,729 and 5,086,930 to Saeks further disclose a rack providing a body member, a lower and an upper height adjustment member, and finely adjustable foot members. Again, Saeks requires the user to adjust the overall length of the body member. This rack, however, has not one, but two height adjustment members which must be individually positioned. Once more, fine adjustment and securement is achieved by manually adjusting two independent foot members. Clearly, set up of these racks is both difficult and time consuming.

In addition to the difficulty experienced in setting up the cited racks, equal frustration can be encountered while taking them down. This is apparent as knock-down requires a reversal of the steps required to set them up.

A further disadvantage of the cited racks is their inability to allow efficient and compact storage when not in use. Even when knocked-down, these racks can be bulky and space consuming.

Another disadvantage of the cited racks is their high production costs, which lead to an expensive retail product.

It is noted that U.S. Pat. No. 706,718 to Bradbury discloses a rack comprising a permanently-secured vertically extensible spindle that rotates, thereby allowing revolving bicycle display or storage. Unfortunately, this rack is not portable and requires extraordinary space to set up, use, and store.

It is also noted that U.S. Pat. Nos. 2,903,227 to Key and 2,855,037 to Stiffel disclose racks that utilize a spring-loaded body member which is not capable of supporting relatively heavy loads.

It is further noted that none of the cited references, or any reference for that matter, disclose a bicycle rack that is capable of efficiently suspending two bicycles in the corner of a room.

OBJECTS AND ADVANTAGES

It is therefore an object and advantage of the present invention to provide a bicycle stand that is easy to set up and knock down.

Another object and advantage of the present invention is to provide a bicycle stand that can be compactly and efficiently stored when not in use.

Another object and advantage is to provide a bicycle stand that effectively suspends relatively heavy loads.

A further object and advantage of the present invention is to provide a stand that allows efficient storage of one or more bicycles in a variety of configurations, including efficient storage of two bicycles in a corner of a room.

Still another object and advantage is to provide a stand that can be produced at a lower cost.

Further objects and advantages of the present invention will become apparent from a consideration of the following descriptions and drawings.

SUMMARY

The Quick-Release Bicycle Stand of the present invention is comprised of a telescopic Main Body Member, Resilient-Pressure End Caps, and a Locking or a Clamping Device whereby the Bicycle Stand can be fixedly extended and subsequently wedged between two opposing surfaces. The Bicycle Stand further comprises a Perpendicular Wheel-Hook Assembly, whereby one or more bicycles can be efficiently stored in a variety of configurations, including the efficient storage of two bicycles in a corner of a room.

DESCRIPTION OF DRAWINGS

FIG. 2 is an exploded view of the Quick-Release Clamp and the Perpendicular Wheel-Hook Assembly.

FIG. 3 shows the Sleeve whereby a correct tolerance between the Upper Body Member and the Lower Body Member is achieved.

NUMERICAL LISTING OF COMPONENTS

| | | | |
|---|---|---|---|
| 10 | MAIN BODY MEMBER | 12 | UPPER BODY MEMBER |
| 14 | LOWER BODY MEMBER | 14A | SLEEVE |
| 16 | QUICK-RELEASE CLAMP | 18 | COLLAR |
| 19 | RELEASE CAM LEVER | 20 | ADJUSTMENT BOLT |
| 22 | PERPENDICULAR WHEEL HOOK ASSEMBLY | 22A | WHEEL HOOK APERTURE SET |
| 22B | WHEEL HOOK APERTURE SET | 24 | WHEEL HOOK |
| 24A | U-BOLT | 26 | RETAINING NUT |
| 28 | SPACER | 30 | WHEEL PROTECTOR |
| 32 | RESILIENT-PRESSURE END CAP (UPPER) | 34 | RESILIENT-PRESSURE END CAP (LOWER) |
| 36 | THRUST WASHER | 38 | SLOT |
| 40 | LOWER TIRE REST | 42 | TIRE TRAY |
| 44 | TUBE CLASP | | |

DESCRIPTION OF INVENTION

Figure 1:
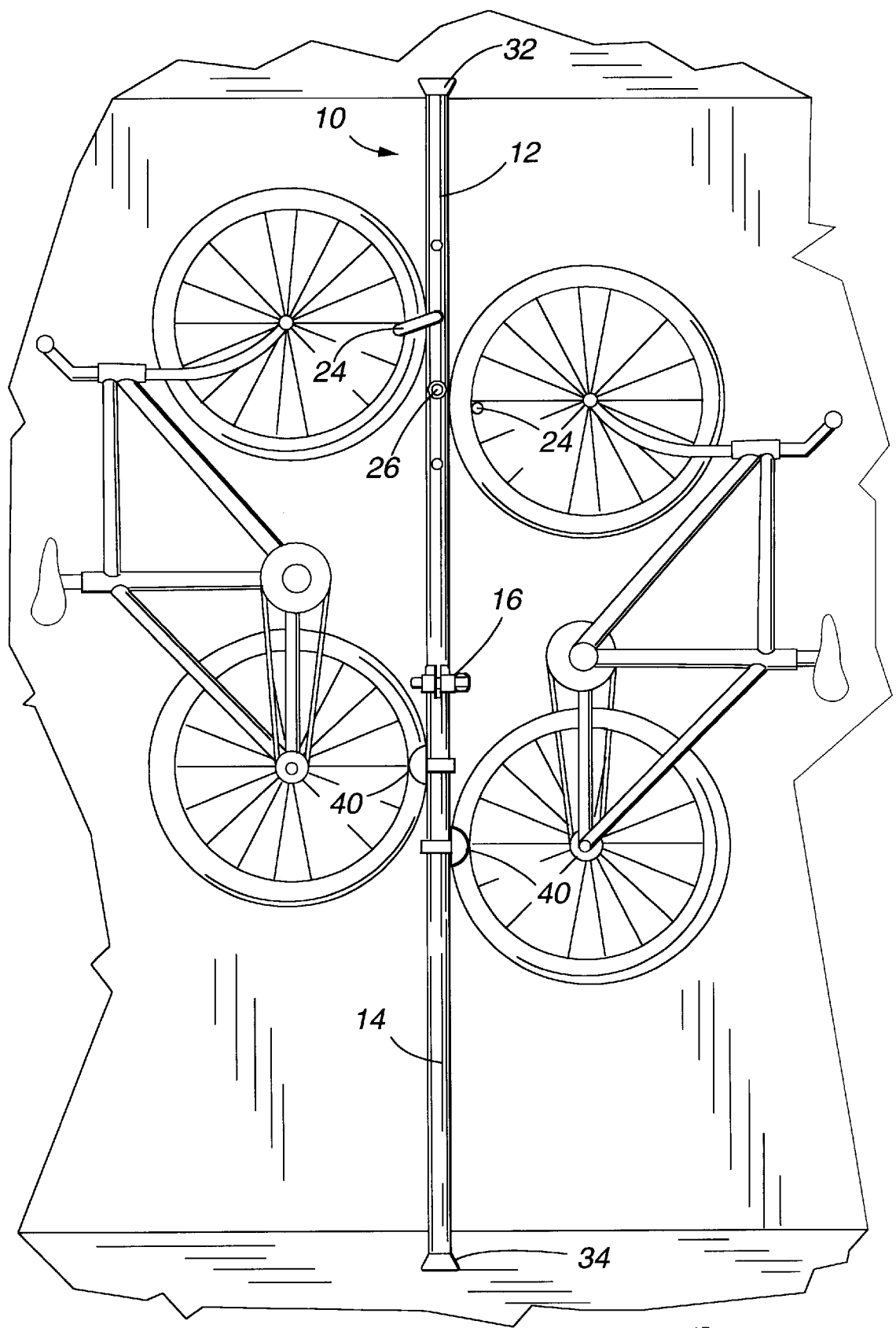
FIG. 1 is an overall view of the Quick-Release Bicycle Stand in an operational position suspending two bicycles in the 180 degree vertically-opposed configuration.

The Quick-Release Bicycle Stand of the present invention is shown in FIGS. 1–8. Referring to FIG. 1, a telescopic Main Body Member (10) is comprised of a Lower Body Member (14) and an interengaging Upper Body Member (12). The Upper Member is slidably disposed within the Lower Member whereby Main Body (10) can be telescopically extended or retracted. This allows adjustment of the overall length of the Main Body.

The preferred embodiment can be constructed utilizing a six foot section of ¾ inch steel conduit for the Upper Member, and a four and one-half foot section of 1 inch steel conduit for the Lower Member. The preferred embodiment utilizes steel conduit as it is readily available and inexpensive. However, it is possible for the Main Body to be manufactured from other materials which may vary in shape, size, and composition. The length of the Upper Member and the Lower Member can also vary, provided that their combined length is greater than the height of the room in which the Bicycle Stand will be used. Additionally, utilizing Body Members (12 & 14) of substantially equal lengths minimizes the retracted length of the Main Body, and will allow the Bicycle Stand to be more compactly stored when not in use.

Referring now to FIG. 2, the Bicycle Stand further provides a Clamp or Locking Device (16) whereby the Main Body can be fixedly secured at a desired length. The preferred embodiment utilizes a Quick-Release type Clamp (16) which is well known in the art and is similar to the type used on bicycle seat posts. Clamp (16) is comprised of a Collar (18), a Release Cam Lever (19), and an Adjustment Bolt Assembly (20). Clamp (16) is positioned substantially at or near the top end of Lower Member (14) and straddles a Groove, Channel, or Slot (38). Slot (38) is of a predetermined width and extends downward from the top end of the Lower Member to a distance substantially beyond Clamp (16). The purpose of the Slot is to allow the Clamp to compress the upper end of Lower Member (14), thereby fixedly engaging Upper Member (12). In order for the Clamp to effectively fix or secure the overall length of Main Body (10), a predetermined tolerance must exist between the Upper Member and the Lower Member. The preferred embodiment achieves this by incorporating a Shim or Sleeve (14A) which has been fabricated from a 2 inch section of 1 inch steel conduit. Referring to FIG. 3, Sleeve (14A) is permanently fitted inside the top end of Lower Member (14) and allows slidable disposition, at a correct tolerance, of Upper Member (12). Achieving the correct tolerance can also be accomplished in other ways, including using Upper and Lower Members (12 & 14) that are prefabricated with the correct dimensions, or by permanently reducing the diameter of the upper end of the Lower Member with a tube compressor, technically known as an informer.

Figure 6:
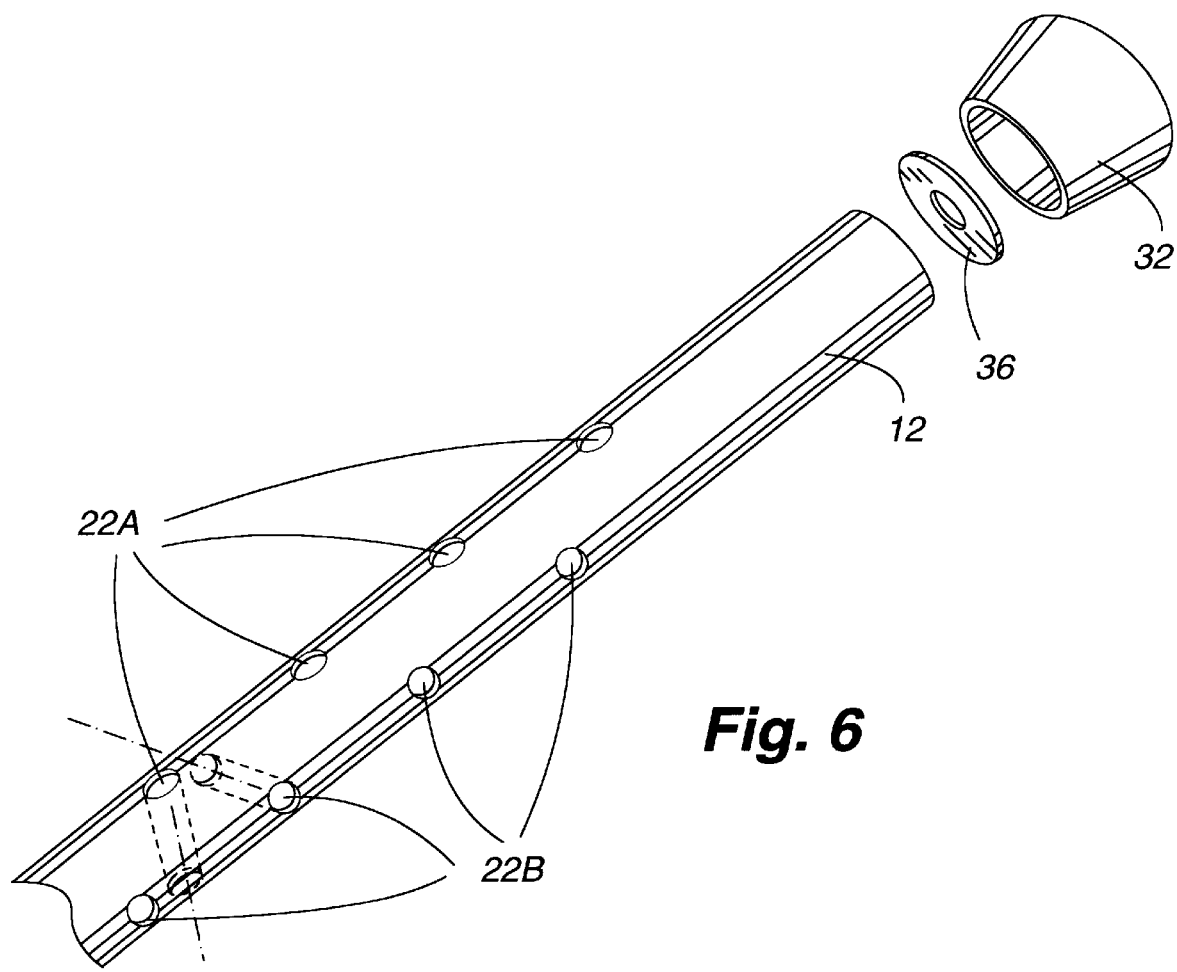
FIG. 6 shows the Wheel Hook Aperture Sets as well as the Upper Resilient-Pressure End Cap and Thrust Washer.

Referring to FIG. 6, a Resilient-Pressure End Cap (32) and a Thrust Washer (36) are positioned substantially at the top end of Upper Member (12). Similarly, a Resilient-Pressure End Cap (34) and a Thrust Washer (36) are positioned substantially at the opposing bottom end of Lower Member (14). The End Caps of the preferred embodiment consist of conventional rubber leg tips which are readily available. The Thrust Washers are conventional washers with a diameter equal to or greater than the outside diameter of the adjoining Body Member.

Figure 7:
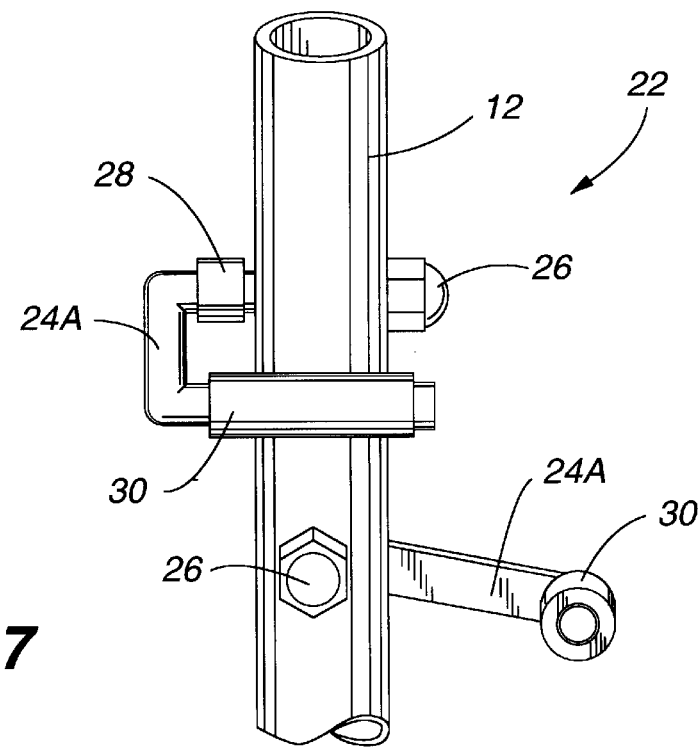
FIG. 7 shows the Perpendicular Wheel-Hook Assembly in the 90 degree vertically-opposed configuration.
Figure 8:
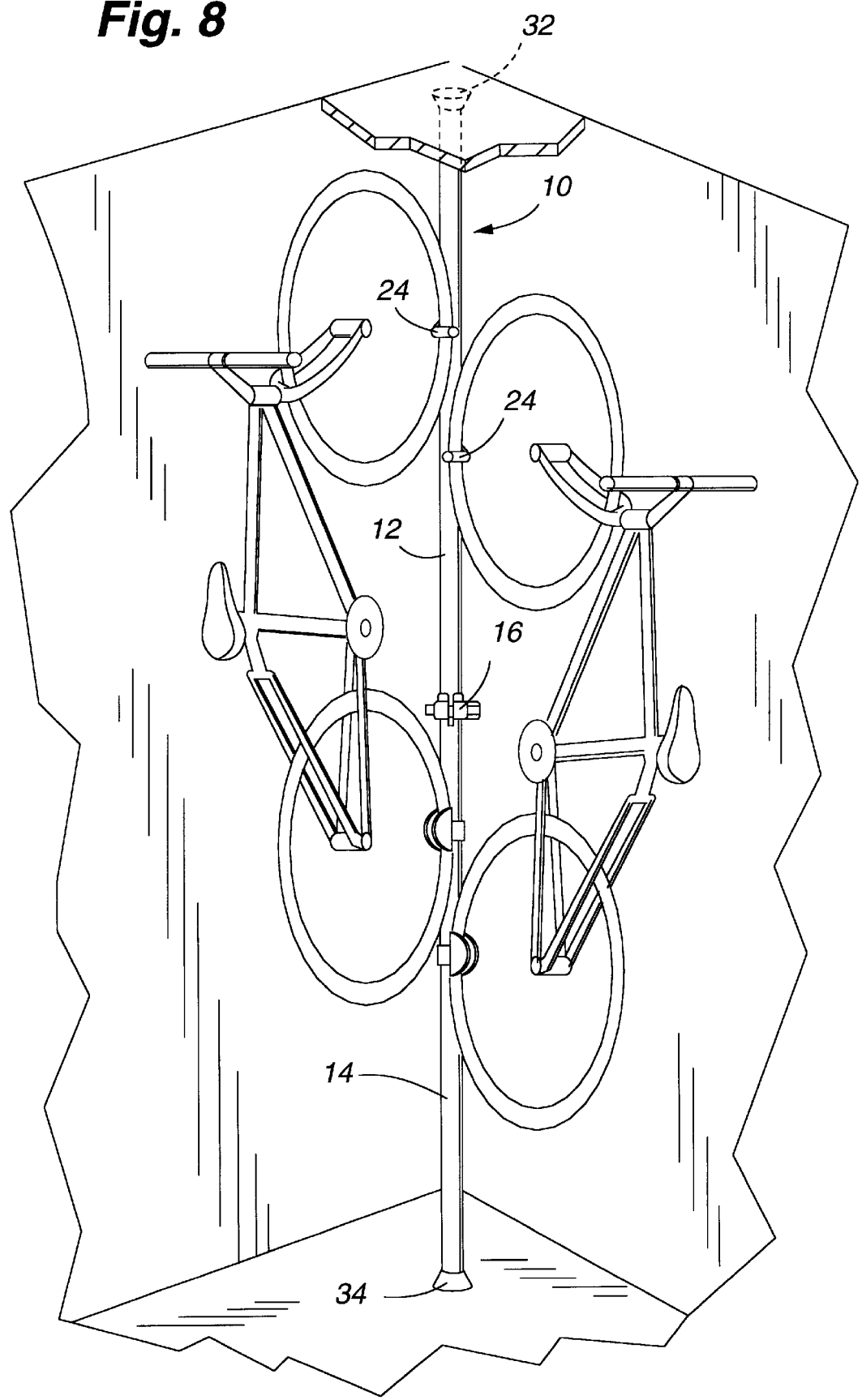
FIG. 8 is a perspective view of the Quick-Release Bicycle Stand in an operational position suspending two bicycles in the 90 degree vertically-opposed configuration.

The Quick-Release Bicycle Stand of the present invention further comprises a Perpendicular Wheel-Hook Assembly (22). Referring to FIGS. 6 and 7, the Perpendicular Wheel-Hook Assembly consists of two distinct sets of Wheel Hook Apertures (22A and 22B) and a pair of Wheel Hooks (24). FIG. 6 shows a set of four evenly-spaced Wheel Hook Apertures (22A) drilled lengthwise along Upper Member (12). A second set of Wheel Hook Apertures (22B) is drilled substantially perpendicular and substantially staggered relative to Aperture Set (22A).

Figure 4:
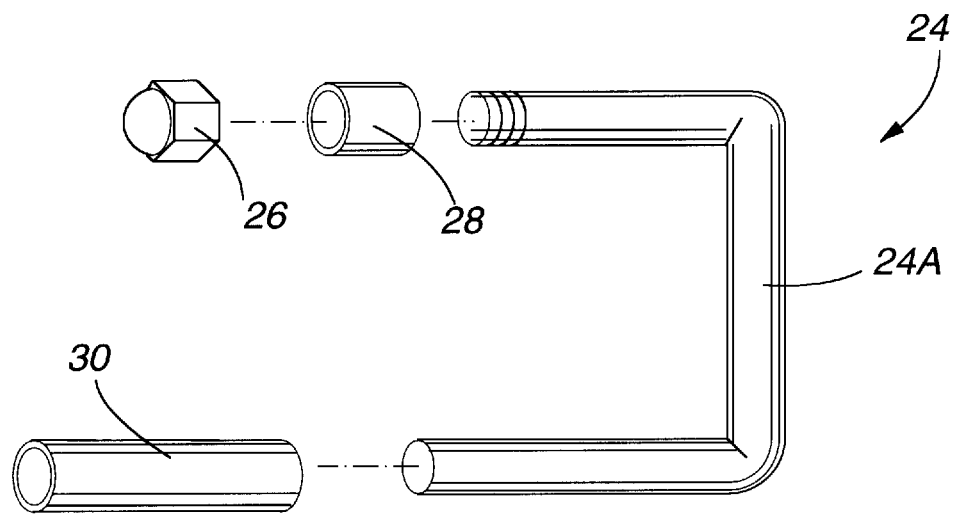
FIG. 4 is a perspective view of the Wheel Hook.

Perpendicular Wheel-Hook Assembly further comprises a pair of Wheel Hooks (24). FIG. 4 is an exploded view of the Wheel Hook which typically consists of a U-Bolt (24A), a Spacer (28), and a Retaining Nut (26). A rubberized Wheel Protector (30) is also provided to protect the wheel of a suspended bicycle.

Figure 5:
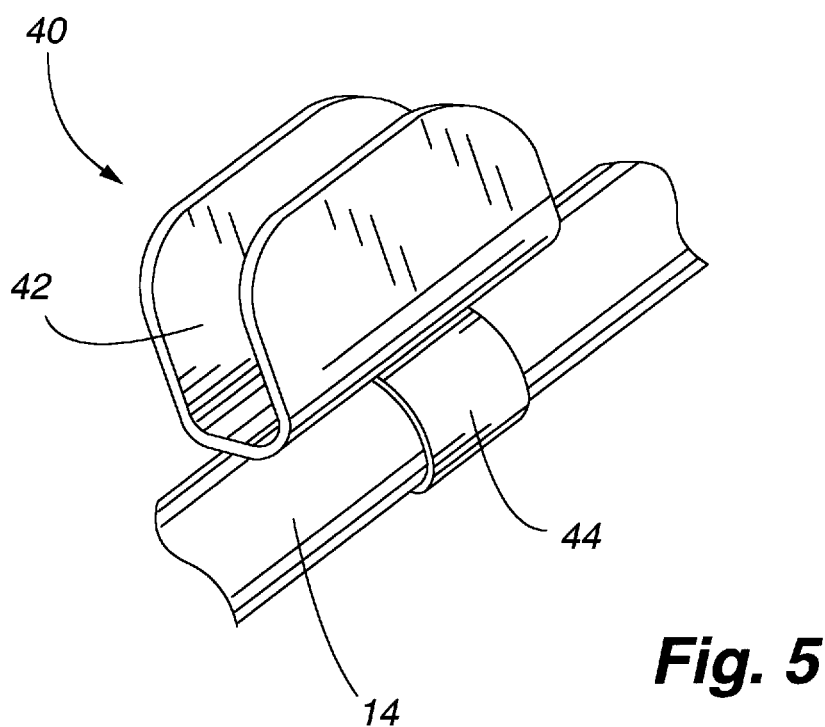
FIG. 5 is a perspective view of the Lower Tire Rest.

Finally, the Quick-Release Bicycle Stand of invention includes a Lower Tire Rest (40) whereby the lower tire of a suspended bicycle is retained. Referring to FIG. 5, the Tire Rest consists of a Tire Tray (42) and a Tube Clasp (44). The Tire Tray is of sufficient size to accommodate a wide range of bicycle tires, and the Tube Clasp is adapted for slidable disposition on the outside of Lower Body Member (14).

OPERATION OF INVENTION

In use, the Quick-Release Bicycle Stand broadly achieves all of the invention's objects and advantages. The Quick-Release Bicycle Stand is easy to set up, knocks down quickly, and can be compactly stored when not being used.

Set up is achieved by simply extending the Main Body at a predetermined angle between the floor and the ceiling, locking the Clamp, and pulling the Bicycle Stand upright into a vertical position. Testing of a prototype found this to be an extremely quick and easy operation. By grasping Lower Member (14) with one hand, the user can vertically extend Upper Member (12) and simultaneously lock the Clamp utilizing the free hand and forearm. Once the Main Body is extended and secured at an angle between the floor and the ceiling, the user simply grasps Main Body (10) at or near the top portion thereof, and pulls the Bicycle Stand into an upright position.

Knock down is also quick and easy and is achieved by simply releasing the Clamp, allowing the Upper Member to collapse. The Clamp can then be locked, securing the Bicycle Stand in a fully retracted position.

The retractability and streamline design of the Quick-Release Bicycle Stand allows compact and efficient storage of the Bicycle Stand when not in use.

The Quick-Release Bicycle Stand further achieves its objects and advantages by providing a stand that effectively suspends relatively heavy loads. When the Main Body is extended and secured at a predetermined angle between the floor and ceiling, the overall length of the Main Body is substantially greater than the height of the room. By subsequently pulling the Main Body into an upright position, the Bicycle Stand is essentially compressed between the two opposing surfaces. The inherent stability produced by this process depends upon both the rigidity of the Main Body and upon the resiliency of the Resilient-Pressure End Caps.

The Quick-Release Clamp of the preferred embodiment, as shown in FIG. 2, has been proven to be very effective in rigidly securing the Main Body at any length of adjustment. Briefly, actuation of Cam Lever (19) shortens or retracts Bolt Assembly (20), thereby compressing Collar (18). The Collar then constricts Lower Member (14) and Sleeve (14A), compromising Slot (38), and fixedly engages Upper Member (12) thereby rigidly securing Main Body (10).

By wedging the Bicycle Stand between the floor and the ceiling, the Resilient-Pressure End Caps are effectively compressed between the rigid Main Body and the opposing surfaces. Once compressed, the resilient nature of the rubber End Caps exerts a continuous expansive pressure, thereby securing the Bicycle Stand into position. This is further facilitated by Thrust Washers (36) which evenly distribute the expansive pressure across the opposing ends of the Main Body. When properly set up, the Quick-Release Bicycle Stand provides incredible stability that is more than capable of suspending relatively heavy loads.

The Perpendicular Wheel-Hook Assembly (22) of the preferred embodiment further achieves the Bicycle Stand's objects and advantages by allowing surprisingly efficient storage of one or more bicycles. By referring to FIGS. 7 and 8, the significance of the Perpendicular Wheel-Hook Assembly will become apparent to anyone skilled in the art. Positioning Wheel Hooks (24) in each of two substantially perpendicular and staggered Wheel Hook Aperture Sets (22A & 22B), as shown in FIG. 7, allows two bicycles to be vertically suspended in a 90 degree opposed configuration. This is significant as it enables the user to efficiently store two bicycles in a corner of a room (See FIG. 8).

By positioning Wheel Hooks in each of two apertures of the same Wheel Hook Aperture Set (22A or 22B), as shown in FIG. 2, the user can also suspend two bicycles in a 180 degree configuration (See FIG. 1). Additionally, the use of only one Wheel Hook allows extremely efficient storage of a single bicycle, even in very confined areas.

Once suspended, the lower tire of a bicycle is retained by Lower Tire Rest (40), which is slidably disposed on the outside of Lower Member (14) and can be adjusted to accommodate the wheel base of different sized bicycles.

The foregoing summary of the preferred embodiment and its operation is intended to broadly outline the details and features of the present invention. The summary in neither intended to define the invention, which is measured by the claims, nor is it intended to be limiting as to the scope of the invention in any way.

CONCLUSIONS, RAMIFICATIONS, AND SCOPE

Clearly, the reader will see that the Quick-Release Bicycle Stand is easy to set up, knocks down quickly, and can be compactly stored when not in use. Further, the Bicycle Stand allows efficient storage of one or more bicycles in variety of configurations. This includes the significant ability to store two bicycles in a corner of a room, a configuration that is impossible to achieve with any other bicycle rack. Additionally, the user will be surprised to find that the Quick-Release Bicycle Stand, which has a low production cost, is also affordable.

As stated, the above summary of the preferred embodiment and its operation is not intended to be limiting as to the scope of the invention. Rather, it is only an example of one of many possible variations. For example, the Main Body could be comprised of other materials which may vary in shape, size, dimensions, color, or composition. The same is true for the Lower Tire Rest, the End Caps, and the Wheel Hooks. The Quick-Release Clamp could be replaced with a welded-nut and bolt assembly or other device and still achieve the objective of rigid securement of the Main Body. As outlined, achieving the correct tolerance between the Upper and Lower Body Members is not limited to use of preferred Sleeve (14A). Further, the exact number, spacing, and configuration of Wheel Hook Apertures (22A & 22B) can vary without compromising the ability to suspend two bicycles in the configurations illustrated. The Bicycle Stand can also include other types of bicycle suspension means, such as frame brackets or other apparatus, whereby one or more bicycles can be efficiently stored in a variety of configurations.

It will be appreciated that the process of rigidly securing the Main Body at a predetermined angle between two opposing mounting surfaces, and subsequently wedging the Main Body between the mounting surfaces is believed to be a novel approach. Therefore, the merit of the invention is not intended to rely entirely upon the significance of the novel Perpendicular Wheel-Hook Assembly. The invention's ability to be quickly and easily set up while still maintaining adequate stability to support relatively heavy loads is considered to be equally significant. It is therefore a broader aim of the invention to provide an article display or storage rack that can be used to suspend almost any article.

Accordingly, the optimal dimensional relationships for the parts of the invention, to include variations in size, materials, shape, form, function, and manner of operation, assembly, and use, are deemed readily apparent and obvious to one skilled in the art, and all equivalent relationships to those illustrated in the drawings or described in the specification are intended to be encompassed by the true nature and spirit of the invention.

Thus, the scope of the invention should be determined by the the appended claims and their legal equivalents, rather than by the descriptions and examples given.

What is claimed is:

1. A bicycle storage or display rack comprising;
   a) a telescopic main body member comprised of at least two interengaging body members whereby said telescopic main body member can be telescopically extended or retracted,
   b) securing means, including a quick release clamp, whereby said telescopic main body member is rigidly and fixedly secured at any length of extension or retraction, c) resilient pressure end caps, positioned substantially at the opposing ends of said telescopic main body member, whereby the main body member, rigidly secured at a length that is substantially greater than the distance between two opposing mounting surfaces, is shifted into a substantially vertical position thereby compressing said resilient pressure end caps between the rigid main body and the mounting surfaces thereby allowing adequate support for suspension of one or more bicycles, d) at least one suspension means for efficiently storing or displaying one or more bicycles.

2. The bicycle rack of claim 1 wherein said securing means includes a quick release clamp comprised of a collar, a release cam lever, and an adjustment bolt assembly, whereby said telescopic main body member is quickly and easily secured at any length of extension or retraction.

3. The bicycle rack of claim 1 wherein said resilient pressure end caps are positioned substantially at the outer ends of said telescopic main body member whereby the resilient pressure end caps can be effectively compressed between the extended and rigidly secured main body and two opposing mounting surfaces.

4. The bicycle rack of claim 3 further including thrust washers thereby allowing even distribution of resilient pressure across the opposing ends of said telescopic main body member.

5. The bicycle rack of claim 1 wherein said suspension means includes a perpendicular wheel hook assembly whereby one or more bicycles can be suspended in a variety of configurations, including the efficient suspension of two bicycles in a corner of a room.

6. The bicycle rack of claim 5 wherein said perpendicular wheel hook assembly includes at least two sets of wheel hook apertures and a pair of wheel hooks whereby a variety of bicycle suspension configurations is provided.

7. The bicycle rack of claim 6 wherein the wheel hook aperture sets comprise two distinct sets of apertures drilled at predetermined intervals lengthwise along the main body, and wherein one set is positioned substantially perpendicular and substantially staggered relative to the other set.

8. The bicycle rack of claim 6 wherein said wheel hook comprises a u bolt, a spacer, a retaining nut, and a wheel protector, whereby said wheel hook is positioned in said wheel hook adjustment apertures thereby facilitating effective suspension of a bicycle from the main body member.

9. The bicycle rack of claim 1 further including a lower tire rest, comprised of a tire tray and a tube clasp, slidably disposed on the main body member whereby the lower wheel of a suspended bicycle of any various wheel base is retained.

10. An article storage or display rack comprising;
a) a telescopic main body member including at least two interengaging body members whereby said telescopic main body member can be telescopically extended or retracted,
b) securing means, including a quick release clamp, whereby said telescopic main body member is rigidly and fixedly secured at any length of extension or retraction,
c) resilient pressure end caps, positioned substantially at the opposing ends of said telescopic main body member, whereby the main body member, rigidly secured at a length that is substantially greater than the distance between two opposing mounting surfaces, is shifted into a substantially vertical position thereby compressing said resilient pressure end caps between the rigid main body and the mounting surfaces thereby allowing adequate support for suspension of one or more bicycles,
d) at least one suspension means for efficiently storing or displaying one or more articles.

11. The storage rack of claim 10 wherein said securing means includes a quick release clamp comprised of a collar, a release cam lever, and an adjustment bolt assembly, whereby said telescopic main body member is quickly and easily secured at any length of extension or retraction.

12. The storage rack of claim 10 wherein said resilient pressure end caps are positioned substantially at the outer ends of said telescopic main body member whereby the resilient pressure end caps can be effectively compressed between the extended and rigidly secured main body and two opposing mounting surfaces.

13. The storage rack of claim 12 further including thrust washers thereby allowing even distribution of resilient pressure across the opposing ends of said telescopic main body member.

14. The storage rack of claim 10 wherein said suspension means includes a perpendicular wheel hook assembly whereby one or more bicycles can be suspended in a variety of configurations, including the efficient suspension of two bicycles in a corner of a room.

15. The storage rack of claim 14 wherein said perpendicular wheel hook assembly comprises at least two sets of wheel hook apertures and a pair of wheel hooks whereby a variety of bicycle suspension configurations is provided.

16. The storage rack of claim 15 wherein the wheel hook aperture sets comprise two distinct sets of apertures drilled at predetermined intervals lengthwise along the main body, and wherein one set is positioned substantially perpendicular and substantially staggered relative to the other set.

17. The storage rack of claim 15 wherein said wheel hook comprises a u bolt, a spacer, a retaining nut, and a wheel protector, whereby said wheel hook is positioned in said wheel hook adjustment apertures thereby facilitating effective suspension of a bicycle from the main body member.

18. The storage rack of claim 10 further including a lower tire rest, comprised of a tire tray and a tube clasp, slidably disposed on the main body member whereby the lower wheel of a suspended bicycle of any various wheel base is retained.

19. A method for storing or displaying articles comprising the steps of:
a) providing a telescopic main body member including at least two interengaging body members whereby said telescopic main body member can be telescopically extended or retracted,
b) providing securing means, including a quick release clamp, for rigidly securing said telescopic main body member at any length of extension or retraction,
c) providing resilient pressure end caps substantially at the opposing ends of said telescopic main body member,
d) extending and rigidly securing said telescopic main body member at a predetermined length and angle between two opposing mounting surfaces,
e) pulling the rigidly extended and secured main body member upright into a substantially vertical position thereby effectively compressing the resilient pressure end caps between the rigidly extended main body member and the two opposing mounting surfaces,
f) providing at least one suspension means whereby one or more articles are effectively suspended from the main body.

* * * * *